C. DE V. GRANT.
TRAP FOR PETROL, OIL, GREASE, AND THE LIKE.
APPLICATION FILED JAN. 27, 1914.
1,199,266.
Patented Sept. 26, 1916.
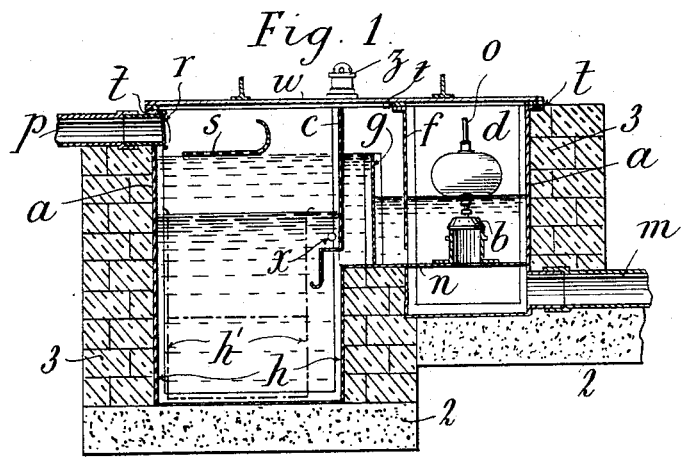
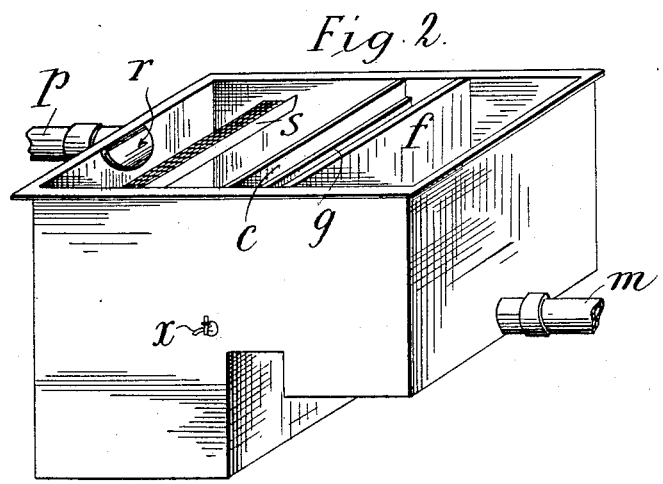
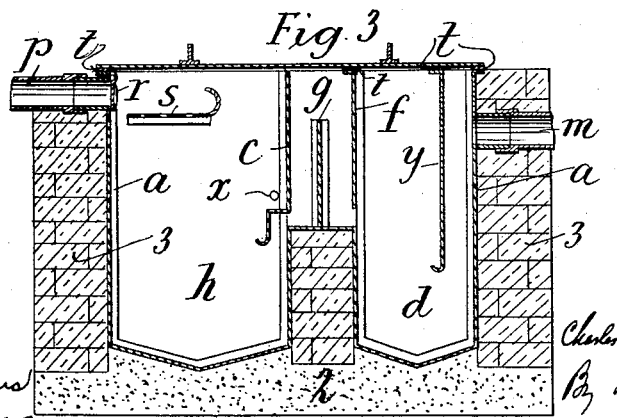

UNITED STATES PATENT OFFICE.

CHARLES DE VERE GRANT, OF LONDON, ENGLAND.

TRAP FOR PETROL, OIL, GREASE, AND THE LIKE.

1,199,266.   Specification of Letters Patent.   Patented Sept. 26, 1916.

Application filed January 27, 1914. Serial No. 814,709.

*To all whom it may concern:*

Be it known that I, CHARLES DE VERE GRANT, a subject of the King of Great Britain and Ireland, residing at London, England, have invented Improvements in Traps for Petrol, Oil, Grease, and the like, of which the following is a specification.

This invention relates to grease traps and particularly to grease traps of the kind having a float-controlled water discharge cock or valve normally submerged in the water within the trap, the inlet side of the trap being separated from the outlet side thereof by a partition that extends from near the top to below the water level near the bottom of the trap.

The object of the invention is to provide a trap of the said kind adapted to effectively trap petrol, oil, grease and the like and suitable for use in connection with garages, dry cleaning works, large domestic or washing up sinks, and other concerns or devices from which liquid is likely to be discharged containing petrol, oil, grease or the like. By so arranging the trap that the discharged liquid must pass through it before escaping say into a sewer or local river the said products can be intercepted thereby not only effecting economy by the saving of the petrol, oil, grease or the like but also preventing the sewer or river being contaminated as well as obviating the risk of dangerous gases liable to explode accumulating in the sewer.

According to the present invention the inlet side of the trap is separated from the outlet side thereof by a partition that extends right across the trap chamber from near the top to below the water level near the bottom of the trap, and by other similar partitions one at least of which extends downwardly from the top of the trap to below the water level and another of which extends upwardly from the bottom of the tank to above the said water level, the passages above and below the partitions being in all cases approximately of the full width of the trap and the discharge from the trap being either below the water level and controlled by a float, or at or near the water level and located behind a partition that depends from the top of the tank to below the water level.

Figure 1 of the accompanying illustrative drawings shows a vertical longitudinal section and Fig. 2 in perspective elevation apart from its setting, one construction of my improved trap. Fig. 3 is a similar view to Fig. 1 showing another construction of the improved trap.

Referring to Figs. 1 and 2 $a$ indicates the body of the trap, $b$ the float controlled discharge valve and $c$ the partition that separates the inlet side of the trap from the outlet side thereof. Between the plate or partition $c$ that extends from nearly the top of the trap to nearly the bottom thereof, and the float-containing discharge chamber $d$ of the trap, another or second plate or partition $f$ is arranged that extends from the top of the trap to below the normal water level of the trap so as to prevent gases passing from the inlet side to the outlet side. There is arranged as shown, between the two plates or partitions $c$ and $f$, a third plate or partition $g$ that extends from the bottom of the trap to above the normal water level but not to the top of the trap. The bottom of the trap below the partitions, that is to say that portion of the bottom between the inlet compartment $h$ and the outlet compartment or discharge chamber $d$ may be at a higher level than the other or side portions so that at the outlet and inlet side two pockets or wells are formed. Arranged within the pocket or well at the inlet side is or may be a removable basket $h^1$ indicated in dotted lines in Fig. 1, into which heavy foreign matters can fall. Extending from the pocket or well at the outlet side, which in the example under notice is of less depth than the pocket or well at the inlet side, is the water outlet branch $m$ and above the level of the said branch the pocket or well is closed by a horizontal partition $n$ in which is formed a hole controlled by the float actuated discharge valve $b$ which is conveniently a disk valve adapted to move vertically toward and from its seat, the float being adjustably connected to a vertical stem $o$ attached to the said valve.

The hinged flap $r$ controlling the inlet $p$, or each inlet if more than one, is made somewhat heavy and is so shaped as to deflect the liquid entering the trap so that it does not disturb the liquid already in the trap but quietly flows into the same in a thin more or less fan-shaped stream. If desired and as illustrated a perforated plate $s$ adapted to break up the entering liquid may be so arranged that the liquid as it enters falls thereon. Preferably the far edge of the plate $s$ may be bent up and over as shown to prevent the liquid flowing directly over the edge of the plate.

In order to make a gas tight joint between the cover $w$ and the upper edge of the plate or partition $f$ and the top of the sides and ends of the trap, packing strips $t$ are gripped between the said parts and the cover $w$.

For convenience in drawing off the oil, petrol, grease or the like from the inlet chamber $h$ of the trap such chamber is or may be fitted with an appropriate cock $x$ fixed thereto in a suitable position.

If necessary the trap may be fitted at its upper part with a relief valve $z$.

In the modified construction shown in Fig. 3 the two pockets or wells in which silt or foreign matter can collect at the bottoms of the inlet and outlet compartments or chambers $h$ and $d$ are of the same depth as each other, and the discharge branch $m$ which in this case is not controlled by a valve, is located near the top of the trap behind a partition $y$ that extends from the top of the trap to well below the water level thereof.

Both the traps illustrated are shown as arranged on a concrete base 2 in a brickwork chamber 3.

The improved trap may be of convenient size and be made of any suitable material, either metal or earthenware or the like or even built up of brickwork or ferro-concrete if of large size, according to the purpose for which it is to be employed.

My invention does not consist in merely providing an oil or grease trap with a number of upwardly and downwardly extending partitions that separate the inlet side of the trap from the outlet side thereof for such traps have already been proposed.

What I claim is:—

In a trap for petrol, oil, grease and the like, a chamber formed with an inlet opening at one side near the top thereof and with an outlet opening at the opposite side, a cover for said chamber, means for making a gas tight joint between said cover and said chamber, a hinged flap arranged in front of the inlet opening of said chamber adapted to deflect liquid downwardly into said chamber, a perforated baffle plate upwardly and forwardly curved along one edge arranged within said chamber slightly below the inlet opening thereof adapted to receive liquid rushing through said inlet opening and to prevent it agitating the bulk of liquid within said chamber, an imperforate partition within said chamber said partition having an upwardly turned lower edge located below the normal liquid level within said chamber and the upper edge of said partition being located slightly below said cover thereby forming a passage over the partition through which gas can pass to and from the compartments of said chamber formed by said partition, a second imperforate partition located between the said first mentioned partition and the outlet side of said chamber and depending from the top of said chamber to well below the normal liquid level within said chamber, means for making a gas tight joint between the top of said second imperforate partition and said cover, and a third imperforate partition located between the two before mentioned said imperforate partitions and extending from the bottom of said chamber to above the normal liquid level within said chamber, all said partitions extending right across said chamber between the inlet and the outlet sides thereof.

Signed at 10 New Court, Lincoln's Inn, London, England, this seventeenth day of January, 1914.

CHARLES DE VERE GRANT.

Witnesses:
W. HENRY SIMMS,
E. J. CROSS.

Copies of this patent may be obtained for five cents each, by addressing the "Commissioner of Patents, Washington, D. C."